UNITED STATES PATENT OFFICE.

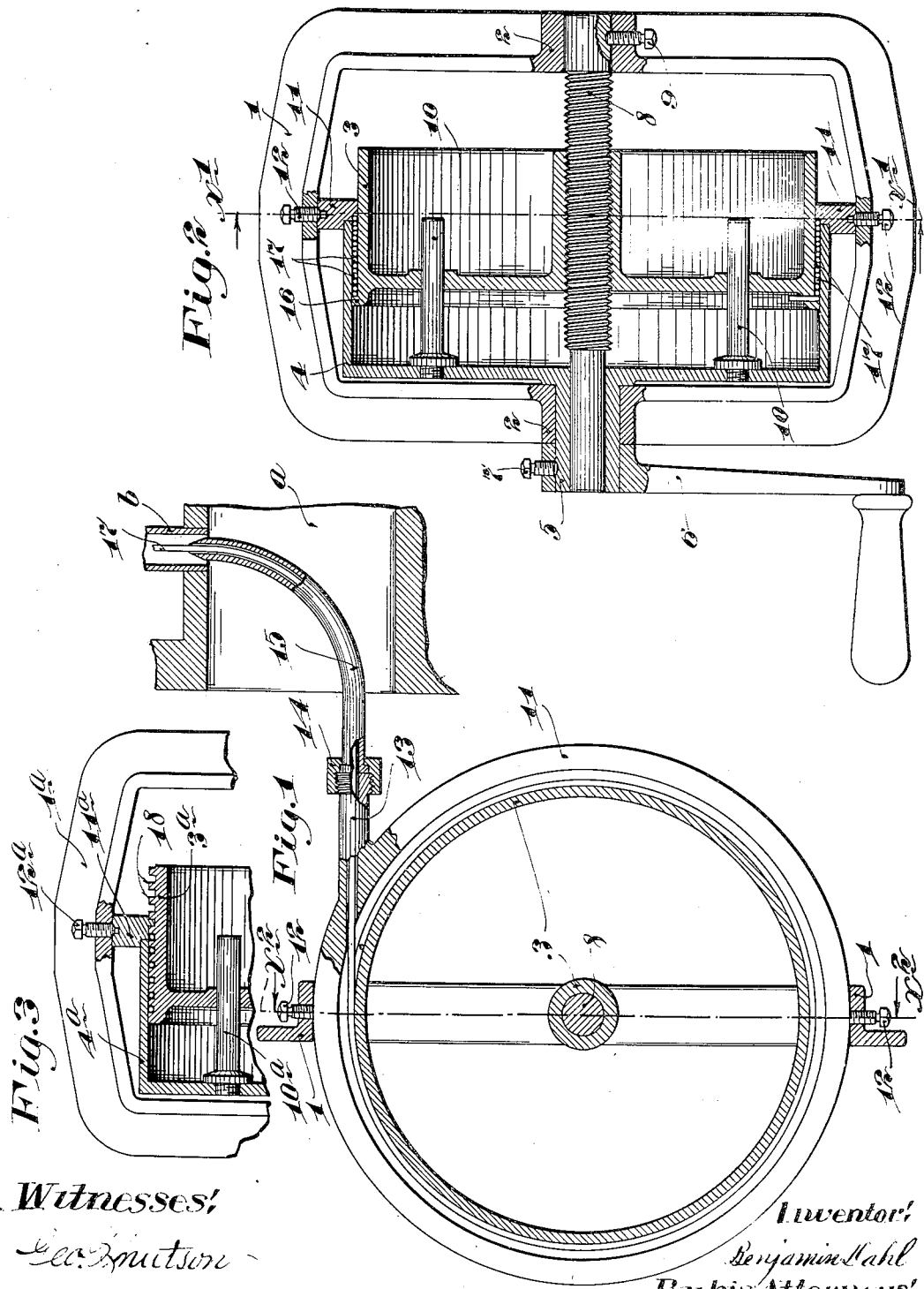

BENJAMIN DAHL, OF MINNEAPOLIS, MINNESOTA.

FISH-WIRE REEL.

1,118,270.          Specification of Letters Patent.          Patented Nov. 24, 1914.

Application filed July 17, 1913. Serial No. 779,433.

*To all whom it may concern:*

Be it known that I, BENJAMIN DAHL, a citizen of the United States, residing at Minneapolis, in the county of Hennepin and State of Minnesota, have invented certain new and useful Improvements in Fish-Wire Reels; and I do hereby declare the following to be a full, clear, and exact description of the invention, such as will enable others skilled in the art to which it appertains to make and use the same.

My invention has for its object to provide an extremely simple and highly efficient fish wire reel adapted for use to thread wires through conduits and then, by reverse movement, to draw the cables through the conduits.

Generally stated, the invention consists of the novel devices and combinations of devices hereinafter described and defined in the claims.

Hitherto, these so-called fish wire reels have been employed, but in all instances, so far as I am aware, they have been provided with traveling or movable wire delivery guides or nozzles. My present invention eliminates this traveling or movable delivery guide or nozzle by a novel arrangement wherein I employ a wire containing reel combined with means for automatically shifting the position thereof, so that it delivers the wire from the reel under one movement, and receives the wire onto the said reel under another movement, at a constant or non-shifting point, to-wit, in line with a relatively fixed wire delivery guide.

In the accompanying drawings which illustrate the invention, like characters indicate like parts throughout the several views.

Referring to the drawings: Figure 1 is a vertical section taken through the improved reel on the line $x^1$ $x^1$ on Fig. 2; Fig. 2 is a vertical section taken approximately on the line $x^2$ $x^2$ on Fig. 1, some parts being shown in full; and Fig. 3 is a view corresponding to Fig. 2, but illustrating a modified construction, some of the parts being broken away.

In Fig. 1, the letter *a* indicates a fuse box and the letter *b* indicates one of the conduits extending therefrom, usually to another fuse box, not shown.

Of course, it will be understood that this reel may be used in connection with various different arrangements of conduits and may be provided in different sizes and designs for different uses.

Referring first to the construction illustrated in Figs. 1 and 2, the numeral 1 indicates a supporting frame shown as in the form of an approximately rectangular yoke, adapted to be supported and secured in any suitable way and having axially alined hubs 2. Working within the frame 1 is a reel made up of inner and outer drums 3 and 4, the former of which is telescoped into the latter. The closed wall or side of the outer drum 4 is provided with a sleeve-like hub 5 that is journaled in one of the hubs 2 of the frame 1, and to the outer end of which, an operating crank 6 is secured, as shown, by means of a set screw 7. The numeral 8 indicates a non-rotary spindle, the right hand end of which, as shown in Fig. 2, is rigidly secured to the right hand hub frame 2, by means of a set screw 9. The reduced left hand end of the said spindle 8 is shown as extended into the sleeve-like hub 5 of the outer drum 4. The inner drum 3 is provided with an internally threaded hub that works on the threaded spindle 8. The inner and outer drums 3 and 4 are caused to partake of the common rotary movement, this, as shown, being accomplished by parallel studs 10 rigidly secured to the web of the outer drum 4 and projecting through perforations in the web of the inner drum 3. The numeral 11 indicates a guide ring which closely surrounds the inner drum 3 and overlaps the adjacent end of the outer drum 4. This guide ring 11 is shown as secured to the frame 1 by set screws 12. At a suitable point, the guide ring 11 is provided with an approximately tangential wire guiding tube or neck 13, which, as shown, is connected by a union 14, to a curved wire guiding tube 15. At its extreme inner edge, the inner drum 3 is provided with an annular wire retaining flange 16 that closely fits the interior of the drum 4, but the cylindrical main body portions of the said drums 3 and 4 are spaced apart sufficiently to afford space for a coil of wire 17. The threads on the spindle 8 should correspond in their travel to the travel of the coil 17. Otherwise stated, the number of threads per inch on the spindle 8 should equal the number of coils per inch in the coil 17. One end of the coil 17 is attached to the inner drum 3 and the other end is extended outward through the guide tubes 13 and 15. The coil 17 and the extended end thereof, affords the fish wire, which is adapted to be first forced endwise, or pushed through the conduit b by an unwinding movement of the drum, and subsequently, and after having been attached to the cable, to be drawn backward and rewound on the drum, thereby drawing the attached cable through the conduit in a well known manner. With this arrangement of the reel, the inner drum 3, as is evident, will shift laterally an amount representing the amount of the wire 17, which is wound up or unwound, and in this way, that portion of the wire which is just leaving the drum or which is just being wound onto the drum, will always be directly alined with the guide tube 13, and hence, there is no occasion for movement in part of the wire delivery guide, in fact, in part, between the reel and the conduit. It is obvious that the guide ring 11 coöperates with the drums 3 and 4 to form the annular chamber for the coil of the wire, and that the width of the said coil chamber increases as the flange 16 of the inner drum moves away from the ring 11 and decreases under a reverse movement, so that the coil of the wire 17 is always kept solid or in compact form.

Referring now to the modified form shown in Fig. 3, 1ª indicates a yoke-like frame, 11ª the guide ring secured thereto by set screws 12ª, and 3ª and 4ª indicate, respectively, the inner and outer drums of the reel. These two drums, as in the first instance, are capable of telescopic movements, but are held to rotate together by studs 10ª. In this modified construction, the inner drum 3ª is provided with a spiral peripheral thread 18 in the groove of which the fish wire 17 is spirally wound on the said drum, said spiral threads 18 have threaded engagement with the guide ring 11ª, but loosely fit within the outer drum 4, but, of course, have no threaded engagement therewith. In this construction, the threaded spindle 8 is not required, so the lateral movements of the inner drum 3ª, in respect to the outer drums 4ª will be controlled by the threaded engagement between the said inner drum and guide ring 11ª. Otherwise stated, the construction may be the same as that illustrated in Figs. 1 and 2. For instance, the same driving crank and the same wire guiding tubes or nozzles may be provided and connected to the said guide ring. Obviously, the lateral movement of the said inner drum must be precisely the same as the lateral shift of the point from which the fish wire winds from the inner drum or at which winds onto the said drum, so that this reel drum, like the reel drum illustrated in Figs. 1 and 2, will ultimately shift to maintain a constant point of delivery onto or from the drum of the constant point of delivery of the fish wire onto or off from the drum.

What I claim is:

1. A fish wire reel made up of two drums telescoped, one onto the other and having a space arranged to hold a coil of wire between them, one of the said drums being mounted to rotate and move laterally, to thereby maintain a constant point of delivery of wire onto or from the said reel.

2. A reel comprising two drums telescoped one into the other and constructed to hold a coiled wire between them, the said two drums being arranged to rotate together, and the inner of said drums having a lateral telescopic movement in respect to the outer drum, to thereby maintain a constant point of delivery onto or off from said reel.

3. A reel comprising two drums telescoped one into the other and constructed to hold a coiled wire between them, the said two drums being arranged to rotate together, and one of said drums having a lateral telescopic movement in respect to the other, to thereby maintain a constant point of delivery onto or off from said reel, and a relatively fixed wire guiding tube receiving from said reel.

4. The combination with a supporting frame, of a reel mounted thereon and made up of two telescoped drums constructed to hold a coil of wire between their peripheral portions, connections between the said two drums causing them to rotate together, a screw-threaded element having engagement with the inner of said drums for causing the same to move laterally and thereby maintain a constant point of delivery of the wire onto or off from said reel.

5. The combination with a supporting frame, of a reel mounted thereon and made up of two telescoped drums constructed to hold a coil of wire between their peripheral portions, connections between the said two drums causing them to rotate together, a screw-threaded element having engagement with one of said drums for causing the same to move laterally and thereby maintain a constant point of delivery of the wire onto or off from said reel, the other drum of said reel being held against lateral movements and provided with a crank by which it may be rotated.

6. The combination with a supporting frame, of a reel mounted thereon and made up of two telescoped drums constructed to hold a coil of wire between their peripheral portions, connections between the said two drums causing them to rotate together, a screw-threaded element having engagement with the inner of said drums for causing the same to move laterally and thereby maintain a constant point of delivery of the wire onto or off from said reel, the outer drum of said reel being held against lateral movements and provided with a crank by which it may be rotated, and a relatively fixed wire guiding tube through which the wire from the reel is passed.

7. The combination with a supporting frame, of a ring mounted thereon and made up of a pair of telescoped drums constructed to hold a coil of wire between their peripheral portions, connections between said two drums for causing them to rotate together, a screw threaded element having engagement with the inner of said drums for causing the same to move laterally in respect to the outer drum, the said outer drum being held against lateral movements and provided with a crank by means of which it may be rotated, and a guide ring supported by said frame and surrounding the inner drum and engageable with the adjacent edge of the outer drum, said guide ring having an approximately tangential wire guiding tube.

In testimony whereof I affix my signature in presence of two witnesses.

BENJAMIN DAHL.

Witnesses:
HARRY D. KILGORE,
F. D. MERCHANT.